(12) United States Patent
Nakagawa (10) Patent No.: US 9,332,308 B2
(45) Date of Patent: May 3, 2016

(54) IMAGE COMMUNICATION APPARATUS AND CONTROL METHOD THEREFOR

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/331,543

(22) Filed: Jul. 15, 2014

(65) Prior Publication Data

US 2015/0058900 A1    Feb. 26, 2015

(30) Foreign Application Priority Data

Aug. 20, 2013 (JP) ................................. 2013-170825

(51) Int. Cl.
| | |
|---|---|
| H04N 5/445 | (2011.01) |
| H04N 21/4402 | (2011.01) |
| H04N 21/41 | (2011.01) |
| H04N 21/436 | (2011.01) |
| H04N 21/231 | (2011.01) |

(52) U.S. Cl.
CPC ... *H04N 21/440218* (2013.01); *H04N 21/4122* (2013.01); *H04N 21/43622* (2013.01); *H04N 21/4402* (2013.01); *H04N 21/23116* (2013.01)

(58) Field of Classification Search
CPC ................................................ H04N 21/23116

USPC .................................................. 725/54, 61, 82
See application file for complete search history.

(56) References Cited

U.S. PATENT DOCUMENTS

| | | | |
|---|---|---|---|
| 2014/0095890 A1* | 4/2014 | Mangalore et al. ........... | 713/189 |
| 2014/0223490 A1* | 8/2014 | Pan et al. ........................ | 725/61 |
| 2014/0250472 A1* | 9/2014 | Huang et al. .................... | 725/82 |
| 2014/0334381 A1* | 11/2014 | Subramaniam et al. ...... | 370/328 |

FOREIGN PATENT DOCUMENTS

| | | |
|---|---|---|
| JP | 2006-236153 A | 9/2006 |
| JP | 2012-133210 A | 7/2012 |

* cited by examiner

*Primary Examiner* — Pankaj Kumar
*Assistant Examiner* — Sahar Baig
(74) *Attorney, Agent, or Firm* — Fitzpatrick, Cella, Harper & Scinto

(57) ABSTRACT

An image communication apparatus has a function of outputting a shot image obtained by imaging an object, a function of displaying at least the shot image, a function of generating a captured image by capturing a displayed image, a function of encoding an image and decoding an encoded image, a function of writing the encoded shot image in a memory and reading out a recorded image stored in the memory, and a function of communicating with another apparatus through a network. The image communication apparatus switches the mode of video to be transmitted to the other apparatus by controlling these functions based on a control event.

17 Claims, 10 Drawing Sheets

IMAGE COMMUNICATION APPARATUS AND CONTROL METHOD THEREFOR

BACKGROUND OF THE INVENTION

1. Field of the Invention

The present invention relates to a technique of transmitting video through a network.

2. Description of the Related Art

A technique of wirelessly mirroring a display screen has been standardized as Wi-Fi Miracast™ by Wi-Fi Alliance®. Mirroring is a technique of sharing a screen by transmitting the display screen of a transmission side apparatus to a reception side apparatus through a network. Unlike transmission of recorded video, mirroring makes it possible to transmit, to a reception apparatus, on-screen display information (to be referred to as "OSD information" hereinafter) such as operation buttons to be superimposed and displayed on video.

If recorded video is played back during mirroring, it becomes necessary to decode the recorded video and encode (to be referred to as "re-encode" hereinafter) a captured image. If video recording is performed during mirroring, two encoding operations (encoding of video for video recording and encoding of a captured image) are required. That is, playback of recorded video and video recording during mirroring increase the processing load. It is possible to distribute the processing load by preparing two encoders, as a matter of course. In this case, however, the cost increases.

Mirroring is different from streaming of recorded video with respect to the presence/absence of OSD information and the presence/absence of screen capturing. When, therefore, switching from mirroring to streaming of recorded video, or vice versa, it is necessary to perform a user operation of temporarily stopping one process, and then starting the other process.

Each of Japanese Patent Laid-Open Nos. 2012-133210 and 2006-236153 proposes a method of reducing the processing load and network load of mirroring. These patent literatures, however, do not disclose any method of preventing the processing load from increasing due to video recording and playback of recorded video during mirroring.

SUMMARY OF THE INVENTION

In one aspect, an image communication apparatus comprising: an imaging unit configured to output a shot image obtained by imaging an object; a display unit configured to display at least the shot image; a capturing unit configured to generate a captured image by capturing an image displayed on the display unit; an encoding and decoding unit configured to encode an image and decode an encoded image; a memory control unit configured to control write of the encoded shot image in a memory and readout of a recorded image stored in the memory; a communication unit configured to communicate with another apparatus through a network; and a mode control unit configured to switch a mode of video to be transmitted to the other apparatus by controlling the imaging unit, the capturing unit, the encoding and decoding unit, the memory control unit, and the communication unit based on a control event.

According to the aspect, it is possible to provide seamless switching of the mode of video to be transmitted to another apparatus. For example, it is possible to seamlessly switch between mirroring and live streaming or between mirroring and streaming of a recorded image.

Further features of the present invention will become apparent from the following description of exemplary embodiments with reference to the attached drawings.

DESCRIPTION OF THE EMBODIMENTS

Image communication according to embodiments of the present invention will be described in detail below with reference to the accompanying drawings. Note that arrangements shown in the embodiments are merely examples, and the present invention is not limited to them.

First Embodiment

[Image Communication System]

Figure 1:
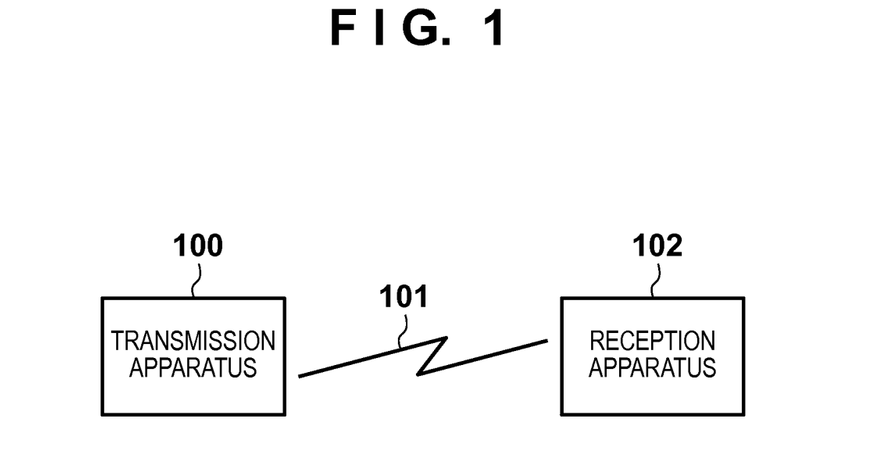
FIG. 1 is a block diagram showing the arrangement of an image communication system according to an embodiment.

FIG. 1 is a block diagram showing the arrangement of an image communication system according to the embodiment.

A transmission apparatus 100 and a reception apparatus 102 are connected through a network 101 to communicate with each other. The network 101 is, for example, a wireless local area network (to be referred to as a "WLAN" hereinafter) as a home network. Note that the network 101 is not limited to the WLAN, and may be a network such as a wired network, wide area network (WAN), ad hoc network, Bluetooth®, ZigBee®, or UWB (ultra wide band).

In response to a request for video distribution received from the reception apparatus 102, the transmission apparatus 100 starts, stops, or pauses transmission of image data. Practical examples of the transmission apparatus 100 are a camera, a video camera, and a smartphone, mobile phone, personal computer (PC), and tablet device each incorporating a camera. However, the present invention is not limited to them, and any device having a hardware arrangement and module arrangement (to be described later) may be used.

The reception apparatus 102 transmits a request for video distribution to the transmission apparatus 100, plays back image data received from the transmission apparatus 100, and plays back on-screen display information (OSD information) to be superimposed and displayed on video at the time of mirroring. The user of the reception apparatus 102 can remotely control the transmission apparatus 100 based on the OSD information. Practical examples of the reception apparatus 102 are a smartphone, mobile phone, PC, tablet device, and television set each having a display screen, and a projector for projecting a screen.

Note that the number of reception apparatuses 102 connected to the transmission apparatus 100 through the network 101 may be one or more.

[Transmission Apparatus]

Figure 2:
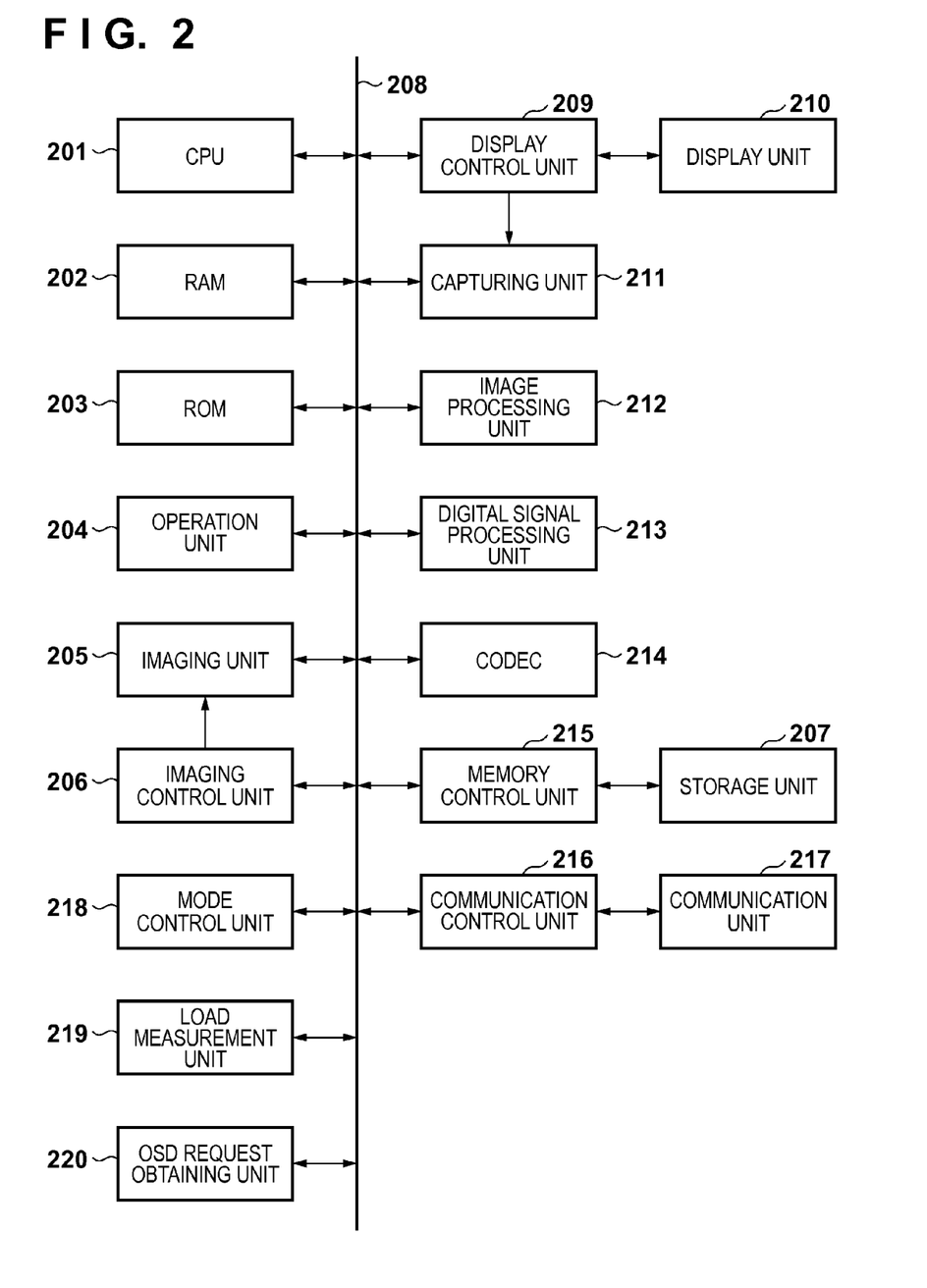
FIG. 2 is a block diagram showing the arrangement of a transmission apparatus.

FIG. 2 is a block diagram showing the arrangement of the transmission apparatus 100.

A central processing unit (CPU) 201 executes various programs stored in a read-only memory (ROM) 203 and the like using, as a work memory, a random access memory (RAM) 202 serving as a main memory, thereby collectively controlling an arrangement (to be described later) through a system bus 208.

An operation unit 204 includes buttons and a mode dial, which are used to input a user instruction. A display control unit 209 executes display control for displaying images and characters on a display unit 210. The display unit 210 is, for example, a liquid crystal display (LCD) for displaying images and characters. The display unit 210 may have a touch screen function. In this case, the touch screen functions as part of the operation unit 204.

An imaging unit 205 includes an imaging optical system, sensor (image sensor), and development processing unit, and obtains optical information of an object through the imaging optical system by the sensor, and outputs image data obtained by performing development processing on an imaging signal output from the sensor. When an imaging start instruction is issued by, for example, pressing an imaging button, the CPU 201 causes the imaging unit 205 to start imaging. When an imaging end instruction is issued by, for example, pressing the imaging button again, the CPU 201 causes the imaging unit 205 to terminate imaging. An imaging control unit 206 performs focus control, shutter control, and aperture control of the imaging optical system of the imaging unit 205.

A digital signal processing unit 213 performs various kinds of processing such as white balance processing, gamma correction processing, and noise reduction processing on the image data output from the imaging unit 205 and the like. An image processing unit 212 performs various kinds of image processing on the image data output from the imaging unit 205 or that output from the digital signal processing unit 213.

An encoding and decoding unit (CODEC) 214 encodes and compresses the image data output from the digital signal processing unit 213 or that output from the image processing unit 212 by an MPEG-4 (Moving Picture Experts Group 4) AVC/H.264 method, and multiplexes the data by an MPEG-2 TS (transport stream) method. MPEG-2 TS indicates a container format for multiplexing and transmitting media data such as an encoded image or sound. Encoding and compression, and multiplexing will be collectively referred to as "encoding" hereinafter.

A memory control unit 215 controls write of the image data encoded by the CODEC 214 in a storage unit 207, and readout of the encoded image data stored in the storage unit 207. The storage unit 207 is, for example, a recording medium such as a flash memory or hard disk.

The CODEC 214 de-multiplexes and decodes the encoded image data read out from the storage unit 207 by the memory control unit 215. The image data decoded by the CODEC 214 is sent to the display control unit 209, and displayed on the display unit 210. De-multiplexing and decoding will be collectively referred to as "decoding" hereinafter.

A capturing unit 211 generates image data by capturing the display image of the display unit 210. A captured image includes, for example, OSD information such as operation buttons to be superimposed and displayed on video.

A communication control unit 216 controls communication with a communication unit 217 through the network 101, and controls, for example, communication of image data and control information transmitted to the reception apparatus 102. The communication control unit 216 has a function of receiving remote control information sent through the network 101. The CPU 201 can process the remote control information received by the communication control unit 216, similarly to a user instruction input through the operation unit 204. The communication unit 217 serves as a network interface for performing communication through the network 101.

A mode control unit 218 controls the mode (to be referred to as a "video mode" hereinafter) of video to be transmitted through the network 101. The video mode includes a mirroring mode to capture and transmit an image being displayed on the display unit 210, a live streaming mode to transmit an image being captured by the imaging unit 205, and a streaming mode to transmit recorded video. A video mode to be used is decided according to the settings of the transmission apparatus 100 or a user instruction.

A load measurement unit 219 measures the processing load of the transmission apparatus 100. As a measurement method, for example, the usage rate of the CPU 201 is measured, or the usage rate of the CODEC 214 is measured. A measurement timing is arbitrary. Assume, for example, that measurement is performed upon detection of a control event.

An OSD request obtaining unit 220 obtains information indicating whether the reception apparatus 102 requires OSD information. As a method of obtaining the information, for example, the setting information of the reception apparatus 102, which pertains to OSD display, is obtained through the network 101, or a display operation of the OSD information by the user of the reception apparatus 102 is detected. A timing at which the information is obtained is arbitrary. Assume, for example, that the information is obtained upon detection of a control event.

Note that a case in which the mode control unit 218, load measurement unit 219, and OSD request obtaining unit 220 are provided as hardware components in the transmission apparatus 100 will be described for the sake of simplicity. However, the CPU 201 may execute programs for implementing the functions of the mode control unit 218, load measurement unit 219, and OSD request obtaining unit 220 (all of which will be described later). In this case, the mode control unit 218, load measurement unit 219, and OSD request obtaining unit 220 are implemented by processing of the CPU 201.

Furthermore, since the information amount of image data is large, image data to be transmitted and received through the network is encoded and compressed. The transmission apparatus 100 uses RTP (Real-time Transport Protocol) as an image data transfer protocol. The transmission apparatus 100 uses RTSP (Real Time Streaming Protocol) as an image data playback control protocol. In addition, since the CODEC 214 uses MPEG-2 TS as a multiplexing method, the communication unit 217 packetizes image data according to RFC 2250 which defines the RTP payload format of MPEG-2 TS data.

Note that RTP is a protocol for transmitting and receiving multimedia data such as a moving image and sound through the network in real time, which has been standardized as RFC 3550. It is possible to use UDP (User Datagram Protocol), HTTP (HyperText Transfer Protocol), HTTPS (HyperText Transfer Protocol Secure), or TCP (Transmission Control Protocol) as a transport protocol in the lower layer of RTP. Furthermore, RTSP is a protocol for controlling streaming, which has been standardized as RFC 2326. As a transport protocol in the lower layer of RTSP, TCP is used.

[Mode Control Unit]

Figure 3:
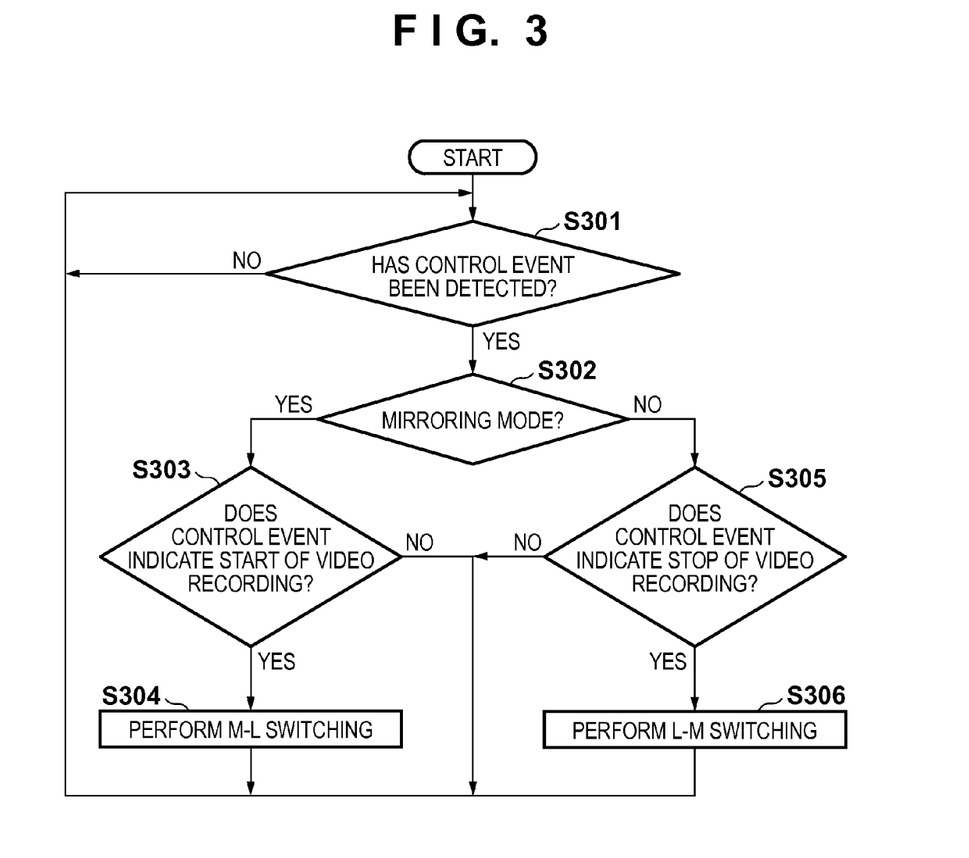
FIG. 3 is a flowchart for explaining control by a mode control unit according to the first embodiment.

Control by the mode control unit 218 according to the first embodiment will be described with reference to a flowchart shown in FIG. 3. For the sake of simplicity, assume that the transmission apparatus 100 is transmitting image data in response to a request for video distribution of the reception apparatus 102.

The mode control unit 218 stands by until a control event is detected (S301). Note that a control event detected by the mode control unit 218 indicates control of the start or stop of video recording by a user instruction, or another control. The user instruction may be an input through the operation unit 204 or remote control through the network 101. Upon detecting a control event, the mode control unit 218 determines whether the current video mode is the mirroring mode (the mirroring mode is in progress) (S302).

If the mode control unit 218 determines that the mirroring mode is in progress, it determines whether the detected control event indicates the start of video recording (S303). If the control event indicates the start of video recording, the mode control unit 218 switches the video mode from the mirroring mode to the live streaming mode (S304); otherwise, the mode control unit 218 does not switch the video mode.

On the other hand, if the mode control unit 218 determines that the mirroring mode is not in progress (that is, the live streaming mode is in progress), it determines whether the detected control event indicates the stop of video recording (S305). If the control event indicates the stop of video recording, the mode control unit 218 switches the video mode from the live streaming mode to the mirroring mode (S306); otherwise, the mode control unit 218 does not switch the video mode.

For example, in the case of the pause of video recording, live streaming is paused using a PAUSE message of RTSP. Furthermore, the video mode is switched while maintaining the connection between the communication unit 217 and the reception apparatus 102 (that is, maintaining an RTSP session, HTTP session, or HTTPS session).

After the above processing, the mode control unit 218 returns the process to step S301. Switching from the mirroring mode to the live streaming mode will be referred to as "M-L switching" hereinafter. Switching from the live streaming mode to the mirroring mode will be referred to as "L-M switching" hereinafter.

M-L Switching

Figure 4:
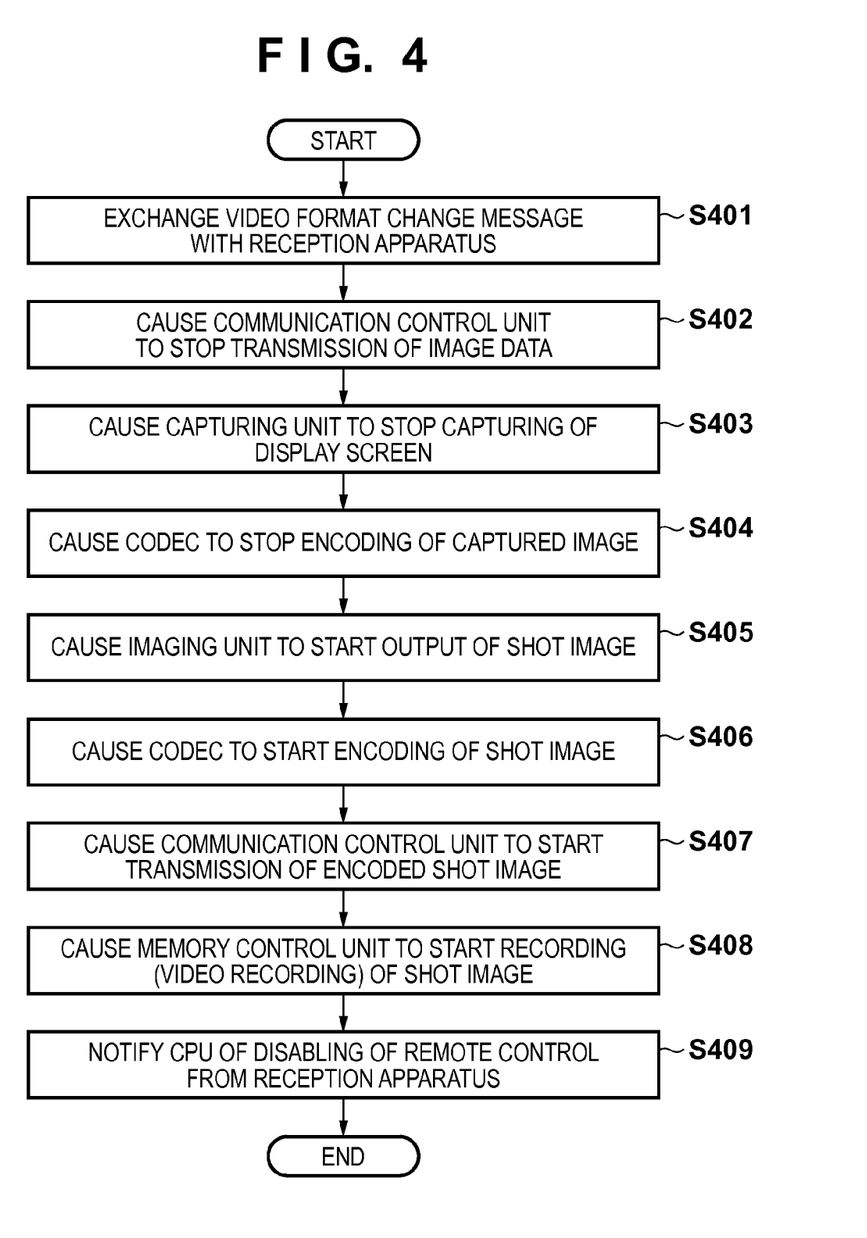
FIG. 4 is a flowchart for explaining M-L switching.

Control by the mode control unit 218 when performing M-L switching (S304) will be described with reference to a flowchart shown in FIG. 4.

The mode control unit 218 controls the communication control unit 216 to exchange a video format change message with the reception apparatus 102 (S401). If, for example, the resolution of video in the mirroring mode is different from that of video in the live streaming mode, it is only necessary to send the resolution and a change timing using RTSP messages SET_PARAMETER and GET_PARAMETER. Note that a video format to be changed includes not only the resolution of video but also a frame rate, a bit rate, a profile to be used by the CODEC 214 for encoding, and a level. If the video format is not changed before and after switching of the video mode, the processing in step S401 can be omitted.

The mode control unit 218 causes the communication control unit 216 to stop transmission of image data (S402), and causes the capturing unit 211 to stop capturing of the display screen (S403). Furthermore, the mode control unit 218 causes the CODEC 214 to stop encoding of the image data (captured image) output from the capturing unit 211 (S404). The above procedure stops mirroring.

The mode control unit 218 causes the imaging unit 205 to start output of image data (captured image) (S405), and causes the CODEC 214 to start encoding of the shot image (S406). With the above procedure, the processing of the CODEC 214 transits from encoding of the captured image to that of the shot image, thereby preventing the CODEC 214 from encoding both the captured image and the shot image.

The mode control unit 218 causes the communication control unit 216 to start transmission of the encoded shot image (S407), and causes the memory control unit 215 to start recording (video recording) of the encoded shot image in the storage unit 207 (S408). The above procedure starts live streaming and video recording. Note that although an image during video recording is displayed on the display unit 210, capturing of the display screen has been stopped, and thus no OSD information is transmitted to the reception apparatus 102.

The mode control unit 218 notifies the CPU 201 of disabling of remote control from the reception apparatus 102 (S409). Note that since no OSD information is transmitted to the reception apparatus 102, remote control using OSD information is impossible. However, the user of the reception apparatus 102 can control playback of live streaming by operating the reception apparatus 102.

L-M Switching

Figure 5:
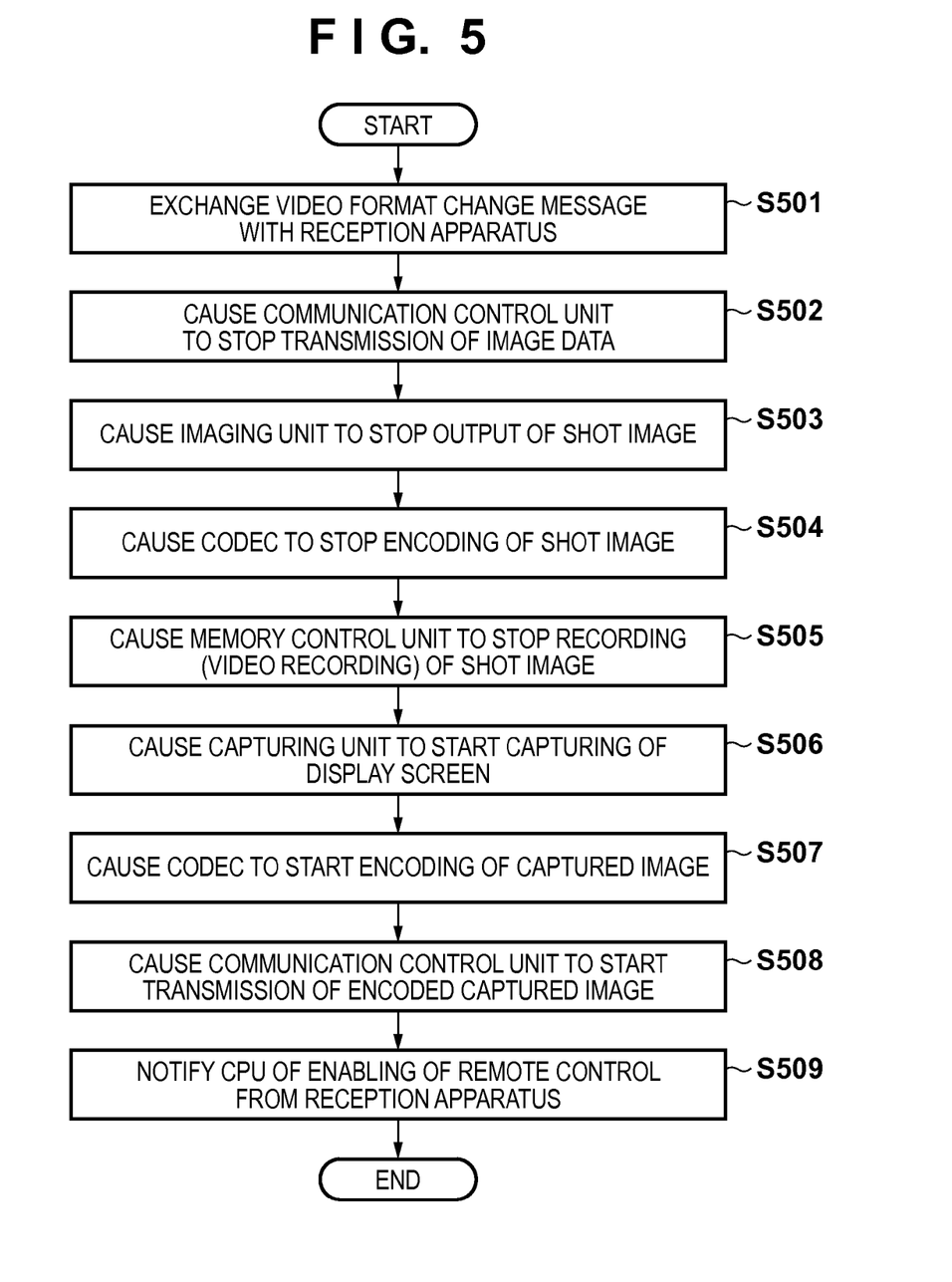
FIG. 5 is a flowchart for explaining L-M switching.

Control by the mode control unit 218 when performing L-M switching (S306) will be described with reference to a flowchart shown in FIG. 5.

Similarly to the processing in step S401, the mode control unit 218 exchanges a video format change message with the reception apparatus 102 (S501).

The mode control unit 218 causes the communication control unit 216 to stop transmission of image data (S502), and causes the imaging unit 205 to stop output of a shot image (S503). Furthermore, the mode control unit 218 causes the CODEC 214 to stop encoding of the shot image (S504), and causes the memory control unit 215 to stop video recording (S505). The above procedure stops live streaming and video recording.

The mode control unit 218 causes the capturing unit 211 to start capturing of the display screen (S506), and causes the CODEC 214 to start encoding of the captured image (S507). With the above procedure, the processing of the CODEC 214 transits from encoding of the shot image to that of the captured image, thereby preventing the CODEC 214 from encoding both the shot image and the captured image.

The mode control unit 218 causes the communication control unit 216 to start transmission of the encoded captured image (S508). This procedure starts mirroring, thereby enabling the reception apparatus 102 to play back OSD information superimposed on the image.

The mode control unit 218 notifies the CPU 201 of enabling of remote control from the reception apparatus 102 (S509). This procedure allows remote control using OSD information in the reception apparatus 102.

As described above, under the control of the mode control unit 218, when the start of video recording is instructed during mirroring, the video mode is switched to the live streaming mode, and when the stop of video recording is instructed during live streaming, the video mode is switched to the mirroring mode. It is, therefore, possible to seamlessly switch between mirroring and live streaming without any switching operation by the user. Since mirroring and video recording do not operate at the same time, it is possible to prevent the processing load from increasing.

Second Embodiment

Image communication according to the second embodiment of the present invention will be described below. Note that in the second embodiment, the same reference numerals as those in the first embodiment denote the same components and detailed description thereof will be omitted.

In the first embodiment, a case in which mirroring and live streaming are seamlessly switched without any switching operation by the user has been explained. In the second embodiment, a case in which mirroring and streaming of recorded video are switched without any switching operation by the user will be described.

Figure 6:
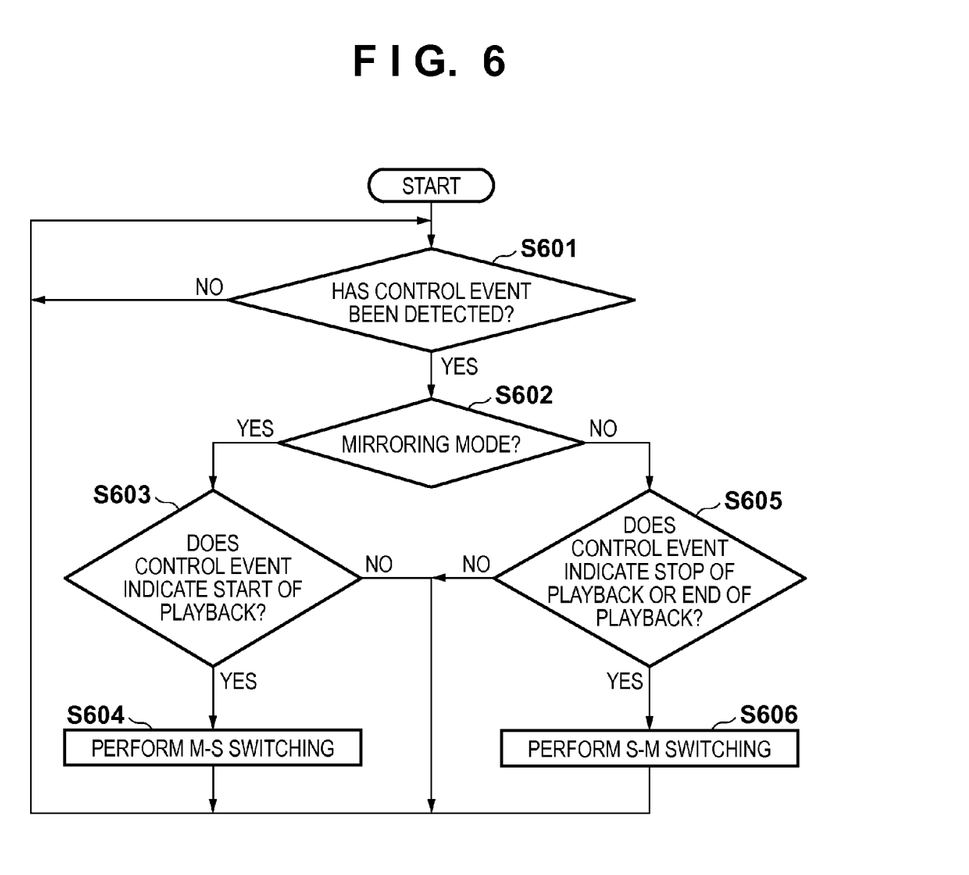
FIG. 6 is a flowchart for explaining control by a mode control unit according to the second embodiment.

Control by a mode control unit 218 according to the second embodiment will be described with reference to a flowchart shown in FIG. 6. For the sake of simplicity, assume that a transmission apparatus 100 is transmitting image data in response to a request for video distribution of a reception apparatus 102.

The mode control unit 218 stands by until a control event is detected (S601). Note that a control event detected by the mode control unit 218 indicates control of the start or stop of playback of recorded video by a user instruction, the end of playback of recorded video due to the lapse of time, or another control. The user instruction may be an input through an operation unit 204 or remote control through a network 101. Upon detecting a control event, the mode control unit 218 determines whether the current video mode is the mirroring mode (the mirroring mode is in progress) (S602).

Note that a CPU 201 for controlling a memory control unit 215 for reading out a recorded image stored in a storage unit 207 issues a control event indicating the end of playback of recorded video.

If the mode control unit 218 determines that the mirroring mode is in progress, it determines whether the detected control event indicates the start of playback (S603). If the control event indicates the start of playback, the mode control unit 218 switches the video mode from the mirroring mode to the streaming mode (S604); otherwise, the mode control unit 218 does not switch the video mode.

On the other hand, if the mode control unit 218 determines that the mirroring mode is not in progress (that is, the streaming mode is in progress), it determines whether the detected control event indicates the stop or end of playback, or another control (S605). If the control event indicates the stop or end of playback, the mode control unit 218 switches the video mode from the streaming mode to the mirroring mode (S606); otherwise, the mode control unit 218 does not switch the video mode.

Alternatively, if the detected control event indicates the pause of playback, the video mode need not be switched.

After the above processing, the mode control unit 218 returns the process to step S601. Switching from the mirroring mode to the streaming mode will be referred to as "M-S switching" hereinafter. Switching from the streaming mode to the mirroring mode will be referred to as "S-M switching" hereinafter.

M-S Switching

Control by the mode control unit 218 when performing M-S switching (S604) will be described with reference to a flowchart shown in FIG. 7.

Similarly to the processing in step S401, the mode control unit 218 exchanges a video format change message with the reception apparatus 102 (S701).

The mode control unit 218 causes a communication control unit 216 to stop transmission of image data (S702), causes a capturing unit 211 to stop capturing of a display screen (S703), and causes a CODEC 214 to stop encoding of a captured image (S704). The above procedure stops mirroring.

The mode control unit 218 causes the memory control unit 215 to start readout of image data (a recorded image) stored in the storage unit 207 (S705), and causes the CODEC 214 to start decoding of the recorded image (S706). Furthermore, the mode control unit 218 causes the communication control unit 216 to start transmission of the recorded image (S707). The above procedure starts streaming of recorded video.

The recorded image decoded by the CODEC 214 is sent to a display control unit 209, and displayed on a display unit 210. Since, however, capturing of the display screen has been stopped, no captured image is obtained. That is, with the above procedure, the processing of the CODEC 214 transits from encoding of the captured image to decoding of the recorded image, thereby preventing the CODEC 214 from performing both encoding of the captured image and decoding of the recorded image.

The mode control unit 218 notifies the CPU 201 of disabling of remote control from the reception apparatus 102 (S708). Note that since no OSD information is transmitted to the reception apparatus 102, remote control using OSD information is impossible. However, the user of the reception apparatus 102 can control streaming playback of recorded video by operating the reception apparatus 102.

S-M Switching

Control by the mode control unit 218 when performing S-M switching (S606) will be described with reference to a flowchart shown in FIG. 8.

Similarly to the processing in step S401, the mode control unit 218 exchanges a video format change message with the reception apparatus 102 (S801).

The mode control unit 218 causes the communication control unit 216 to stop transmission of image data (S802), causes the memory control unit 215 to stop readout of a recorded image (S803), and causes the CODEC 214 to stop decoding of the recorded image (S804). The above procedure stops streaming of recorded video. Note that when playback of the recorded image is stopped, an operation screen or a shot image output from an imaging unit 205 is displayed on the display unit 210.

The mode control unit 218 causes the capturing unit 211 to start capturing of the display screen (S805), and causes the CODEC 214 to start encoding of the captured image (S806). With the above procedure, the processing of the CODEC 214 transits from decoding of the recorded image to encoding of the captured image, thereby preventing the CODEC 214 from performing both decoding of the recorded image and encoding of the captured image.

The mode control unit 218 causes the communication control unit 216 to start transmission of the encoded captured image (S807). This procedure starts mirroring, thereby enabling the reception apparatus 102 to play back OSD information superimposed on the image.

The mode control unit 218 notifies the CPU 201 of enabling of remote control from the reception apparatus 102 (S808). This procedure allows remote control using OSD information in the reception apparatus 102.

As described above, under the control of the mode control unit 218, when the start of playback of recorded video is instructed during mirroring, the video mode is switched to the streaming mode. When the stop of playback is instructed during streaming of recorded video or when playback ends, the video mode is switched to the mirroring mode. It is, therefore, possible to seamlessly switch between mirroring and streaming without any switching operation by the user. Since mirroring and playback of recorded video do not operate at the same time, it is possible to prevent the processing load from increasing.

Third Embodiment

Image communication according to the third embodiment of the present invention will be described below. Note that in the third embodiment, the same reference numerals as those in the first and second embodiments denote the same components and detailed description thereof will be omitted.

In the first and second embodiments, a case in which the video mode is switched without any switching operation by the user has been explained. In the third embodiment, a case in which the video mode is switched according to the processing load will be described.

Figure 9:
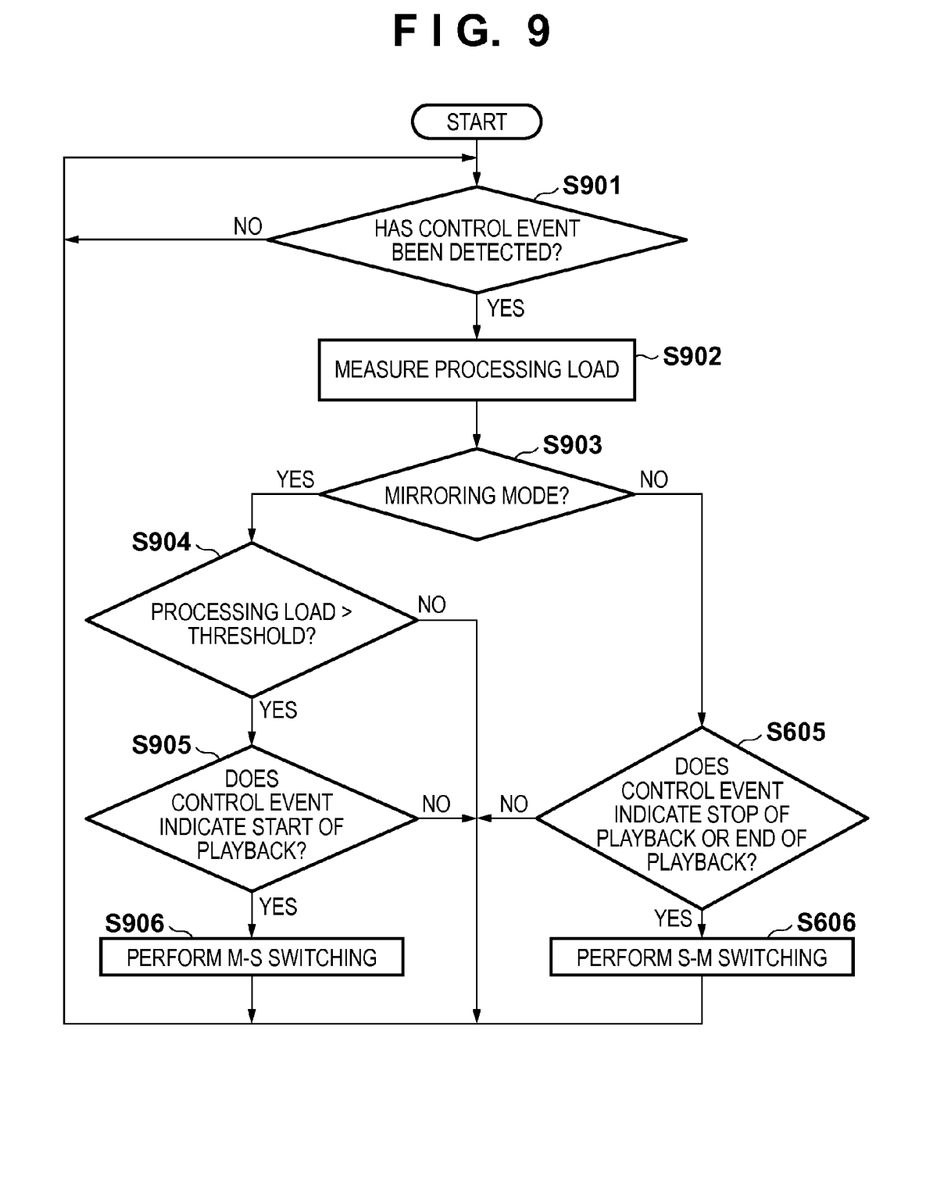
FIG. 9 is a flowchart for explaining control by a mode control unit according to the third embodiment.

Control by a mode control unit 218 according to the third embodiment will be described with reference to a flowchart shown in FIG. 9. For the sake of simplicity, assume that a transmission apparatus 100 is transmitting image data in response to a request for video distribution of a reception apparatus 102.

The mode control unit 218 stands by until a control event is detected (S901). Note that a control event detected by the mode control unit 218 indicates control of the start or stop of playback of recorded video by a user instruction, the end of playback of recorded video due to the lapse of time, or another control, similarly to the second embodiment.

Upon detecting a control event, the mode control unit 218 causes a load measurement unit 219 to measure a processing load L of the transmission apparatus 100 (S902), and determines whether the current video mode is the mirroring mode (whether the mirroring mode is in progress) (S903).

If the mode control unit 218 determines that the mirroring mode is in progress, it compares the measured processing load L with a predetermined threshold th (S904), and determines whether the detected control event indicates the start of playback (S905). Note that although it is possible to set an arbitrary value as the threshold th, it is desirable to set, as the threshold th, a maximum load level which prevents the processing of the transmission apparatus 100 from being delayed.

If a comparison result indicates that the processing load is equal to or lower than the threshold (L≤th), or the control event does not indicate the start of playback, the mode control unit 218 does not switch the video mode. In other words, the mode control unit 218 maintains the mirroring mode.

On the other hand, if the comparison result indicates that the processing load exceeds the threshold (L>th) and the control event indicates the start of playback, the mode control unit 218 performs M-S switching to switch the video mode from the mirroring mode to the streaming mode (S906).

That is, when a recorded image of a high resolution or high bit rate is transmitted, if mirroring is performed, the processing load increases due to re-encoding of the image. Therefore, streaming of recorded video is performed without mirroring. On the other hand, when recorded video of a low resolution or low bit rate is transmitted, the apparatus has sufficient processing capability to perform re-encoding. Therefore, it is possible to transmit OSD information by decoding and mirroring the recorded image.

On the other hand, if the mode control unit 218 determines that the mirroring mode is not in progress (that is, the streaming mode is in progress), it performs the processes in steps S605 and S606 of the second embodiment. That is, if the control event indicates the stop or end of playback, the mode control unit 218 performs S-M switching to switch the video mode from the streaming mode to the mirroring mode.

Figure 7:
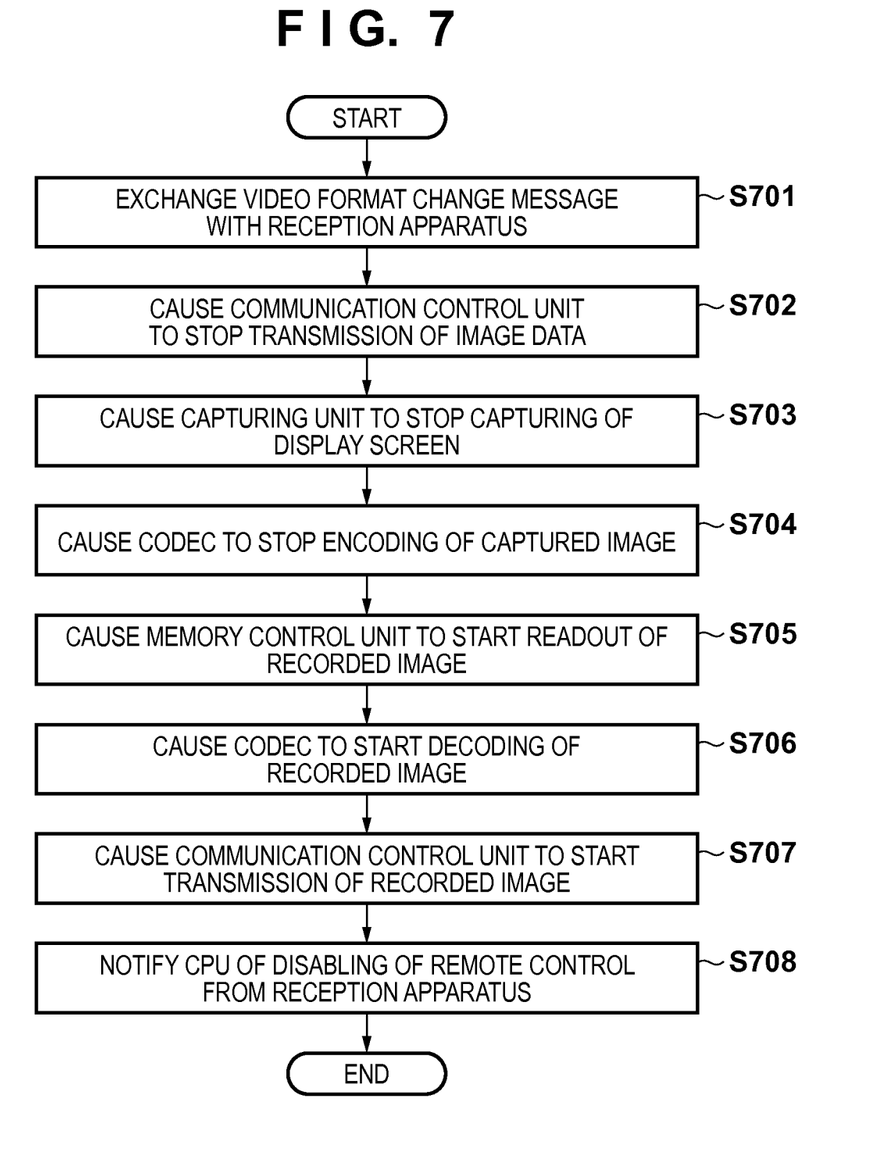
FIG. 7 is a flowchart for explaining M-S switching.
Figure 8:
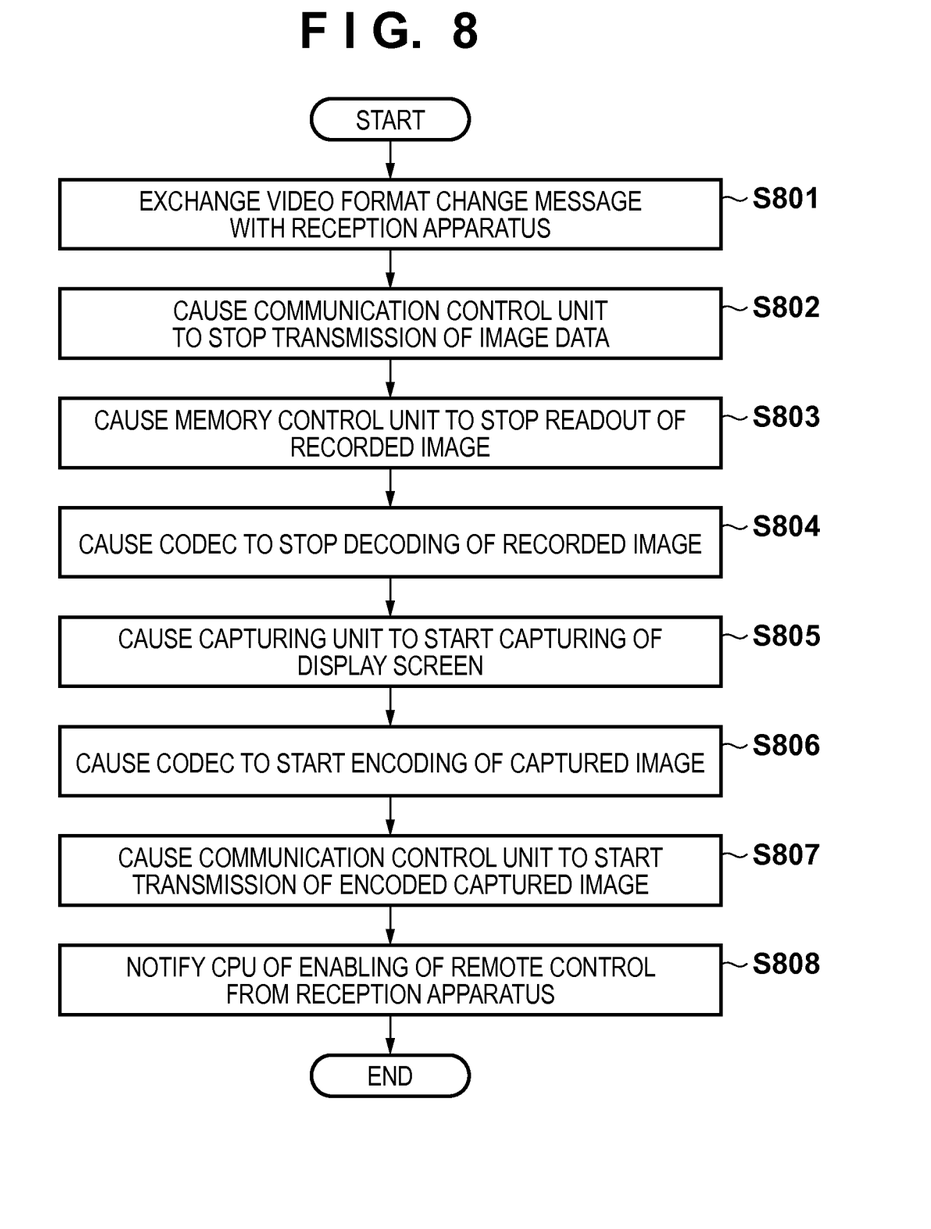
FIG. 8 is a flowchart for explaining S-M switching.

Note that M-S switching in step S906 is the same as the processing shown in FIG. 7 and S-M switching is the same as the processing shown in FIG. 8, and a description thereof will be omitted.

As described above, M-S switching is performed in consideration of the processing load. Therefore, in addition to switching of the video mode without any switching operation by the user, if the apparatus has sufficient processing capability, it is possible to transmit OSD information to the reception apparatus 102 while maintaining the mirroring mode without performing M-S switching.

Fourth Embodiment

Image communication according to the fourth embodiment of the present invention will be described below. Note that in the fourth embodiment, the same reference numerals as those in the first to third embodiments denote the same components and detailed description thereof will be omitted.

In the first and second embodiments, a case in which the video mode is switched without any switching operation by the user has been explained. In the fourth embodiment, a case in which the video mode is switched depending on whether a reception apparatus 102 requires OSD information will be described.

Figure 10:
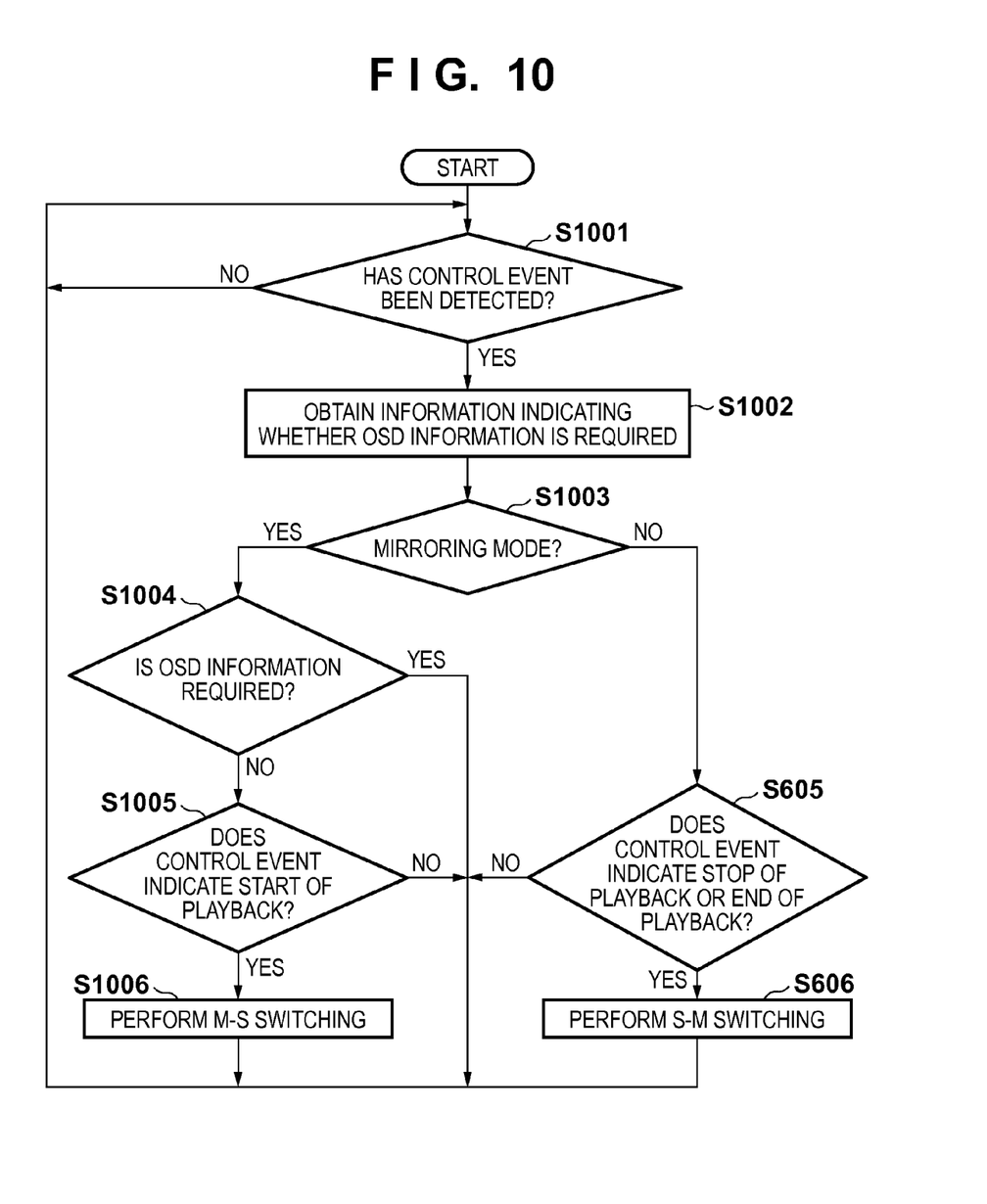
FIG. 10 is a flowchart for explaining control by a mode control unit according to the fourth embodiment.

Control by a mode control unit 218 according to the fourth embodiment will be described with reference to a flowchart shown in FIG. 10. For the sake of simplicity, assume that a transmission apparatus 100 is transmitting image data in response to a request for video distribution of the reception apparatus 102.

The mode control unit 218 stands by until a control event is detected (S1001). Note that a control event detected by the mode control unit 218 indicates control of the start or stop of playback of recorded video by a user instruction, the end of playback of recorded video due to the lapse of time, or another control, similarly to the second embodiment.

Upon detecting a control event, the mode control unit 218 causes an OSD request obtaining unit 220 to obtain information indicating whether the reception apparatus 102 requires OSD information (S1002). The mode control unit 218 then determines whether the current video mode is the mirroring mode (whether the mirroring mode is in progress) (S1003).

If the mode control unit 218 determines that the mirroring mode is in progress, it determines based on the information obtained in step S1002 whether the reception apparatus 102 requires OSD information (S1004). The mode control unit 218 determines whether the detected control event indicates the start of playback (S1005).

If the mode control unit 218 determines that the reception apparatus 102 requires OSD information, or the control event does not indicate the start of playback, the mode control unit 218 does not switch the video mode. In other words, the mode control unit 218 maintains the mirroring mode.

On the other hand, if the mode control unit 218 determines that the reception apparatus 102 requires no OSD information and the control event indicates the start of playback, the mode control unit 218 performs M-S switching to switch the video mode from the mirroring mode to the streaming mode (S1006).

If the mode control unit 218 determines that the mirroring mode is not in progress (that is, the streaming mode is in progress), it performs the processes in step S605 and S606 of the second embodiment. That is, if the control event indicates the stop or end of playback, the mode control unit 218 performs S-M switching to switch the video mode from the streaming mode to the mirroring mode.

Note that M-S switching in step S1006 is the same as the processing shown in FIG. 7 and S-M switching is the same as the processing shown in FIG. 8, and a description thereof will be omitted.

As described above, M-S switching is performed depending on whether the reception apparatus 102 requires OSD information. Therefore, in addition to switching of the video mode without any switching operation by the user, if OSD information is required, it is possible to transmit OSD information to the reception apparatus 102 while maintaining the mirroring mode without performing M-S switching.

Modification of Embodiments

A case in which MPEG-4 AVC/H.264 is used as a video encoding and decoding method has been explained above. The present invention, however, is not limited to this. It is possible to use a video encoding and decoding method such as MPEG-2 and HEVC/H.265.

A case in which MPEG-2 TS is used as the container format of encoded video has been described above. The present invention, however, is not limited to this. It is possible to use another container format suitable for streaming, such as an MP4 format or MOV format.

A case in which RTP is used as a data transfer protocol has been explained above. The present invention, however, is not limited to this. It is possible to use another protocol in the same or different layer of the OSI reference model, such as HTTP, HTTPS, or TCP.

Furthermore, a case in which RTSP is used as a playback control protocol has been described above. However, it is also possible to use a playback control protocol such as SIP (Session Initiation Protocol) or SOAP (Simple Object Access Protocol).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-170825 filed Aug. 20, 2013, which is hereby incorporated by reference herein in its entirety.

What is claimed is:

1. An image communication apparatus comprising:
an imaging unit configured to output a shot image obtained by imaging an object;
a display unit configured to display at least the shot image;
a capturing unit configured to generate a captured image by capturing an image displayed on the display unit;
an encoding unit configured to encode an image,
a decoding unit configured to decode an encoded image;
a memory control unit configured to control write of the encoded shot image in a memory and readout of a recorded image stored in the memory;
an obtaining unit configured to obtain information indicating whether another apparatus requires OSD (On Screen Display) information;
an accepting unit configured to accept instruction for playback of the recorded image stored in the memory; and
a transmission unit configured to transmit the recorded image to the other apparatus through a network and switch transmission modes of the recorded image based on the information obtained by the obtaining unit, and
a measurement unit configured to measure a processing load of the image communication apparatus,
wherein the transmission modes comprise a first mode of transmitting the recorded image on which a plurality of processes of the decoding unit, the display unit, the capturing unit, and the encoding unit are performed, and a second mode of transmitting the recorded image on which processes that at least one process is excluded from the plurality of processes are performed, and
wherein, in a case where the measured processing load is not higher than a predetermined threshold, the transmission unit transmits the recoded image data by the first mode.

2. The apparatus according to claim 1, wherein the display unit displays the decoded recorded image.

3. The apparatus according to claim 1, wherein the captured image includes the OSD information to be displayed on the display unit.

4. The apparatus according claim 1, wherein the accepting unit accepts the instruction from an operation unit of the image communication apparatus or the other apparatus through the network.

5. The apparatus according to claim 1, wherein in a case where the transmission unit transmits the recorded image by the first mode, remote control from the other apparatus is enabled, and in another case where the transmission unit transmits the recorded image by the second mode, the remote control from the other apparatus is disabled.

6. The apparatus according to claim 1, wherein the transmission unit exchanges a format change message with the other apparatus.

7. A control method comprising:
outputting, by an image communication apparatus, a shot image obtained by imaging an object;
displaying, by the image communication apparatus, at least the shot image;
generating, by the image communication apparatus, a captured image by capturing an image displayed on the display unit;
encoding, by the image communication apparatus, an image;
decoding, by the image communication apparatus, an encoded image;
controlling, by the image communication apparatus, write of the encoded shot image in a memory and readout of a recorded image stored in the memory;
obtaining, by the image communication apparatus, information indicating whether another apparatus requires OSD (On Screen Display) information;

accepting, by the image communication apparatus, instruction for playback of the recorded image stored in the memory; and transmitting, by the image communication apparatus, the recorded image to the other apparatus through a network;

switching transmission modes of the recorded image based on the information obtained; and measuring a processing load of the image communication apparatus, wherein the transmission modes comprise a first mode of transmitting the recorded image on which a plurality of processes of the decoding, the display, the capturing, and the encoding are performed, and a second mode of transmitting the recorded image on which processes that at least one process is excluded from the plurality of processes are performed, and wherein, in a case where the measured processing load is not higher than a predetermined threshold, the recorded image data is transmitted by the first mode.

8. A non-transitory computer readable medium storing a computer-executable program for causing a computer to perform a control method, the method comprising:
outputting, by an image communication apparatus, a shot image obtained by imaging an object;
displaying, by the image communication apparatus, at least the shot image;
generating, by the image communication apparatus, a captured image by capturing an image displayed on the display unit;
encoding, by the image communication apparatus, an image;
decoding, by the image communication apparatus, an encoded image;
controlling, by the image communication apparatus, write of the encoded shot image in a memory and readout of a recorded image stored in the memory;
obtaining, by the image communication apparatus, information indicating whether another apparatus requires OSD (On Screen Display) information;
accepting, by the image communication apparatus, instruction for playback of the recorded image stored in the memory; and
transmitting, by the image communication apparatus, the recorded image to the other apparatus through a network;
switching transmission modes of the recorded image based on the information obtained; and
measuring a processing load of the image communication apparatus,
wherein the transmission modes comprise a first mode of transmitting the recorded image on which a plurality of processes of the decoding, the display, the capturing, and the encoding are performed, and a second mode of transmitting the recorded image on which processes that at least one process is excluded from the plurality of processes are performed, and
wherein, in a case where the measured processing load is not higher than a predetermined threshold, the recorded image data is transmitted by the first mode.

9. The apparatus according to claim 1, wherein the transmission unit transmits the recorded image to the other apparatus through a wireless local area network.

10. An image communication apparatus comprising:
an imaging unit configured to output a shot image obtained by imaging an object;
a display unit configured to display at least the shot image;
a capturing unit configured to generate a captured image by capturing an image displayed on the display unit;
an encoding unit configured to encode an image,
a decoding unit configured to decode an encoded image;
a memory control unit configured to control write of the encoded shot image in a memory and readout of a recorded image stored in the memory;
an obtaining unit configured to obtain information indicating whether another apparatus requires OSD (On Screen Display) information;
an accepting unit configured to accept instruction for playback of the recorded image stored in the memory; and
a transmission unit configured to transmit the recorded image to the other apparatus through a network and switch transmission modes of the recorded image based on the information obtained by the obtaining unit,
wherein the transmission modes comprise a first mode of transmitting the recorded image on which a plurality of processes of the decoding unit, the display unit, the capturing unit, and the encoding unit are performed, and a second mode of transmitting the recorded image on which processes that at least one process is excluded from the plurality of processes are performed, and
wherein, in a case where the transmission unit transmits the recorded image by the first mode, remote control from the other apparatus is enabled, and in another case where the transmission unit transmits the recorded image by the second mode, the remote control from the other apparatus is disabled.

11. The apparatus according to claim 10, wherein the display unit displays the decoded recorded image.

12. The apparatus according to claim 10, wherein the captured image includes the OSD information to be displayed on the display unit.

13. The apparatus according claim 1, wherein the accepting unit accepts the instruction from an operation unit of the image communication apparatus or the other apparatus through the network.

14. The apparatus according to claim 10, wherein the transmission unit exchanges a format change message with the other apparatus.

15. The apparatus according to claim 10, wherein the transmission unit transmits the recorded image to the other apparatus through a wireless local area network.

16. A control method comprising:
outputting, by an image communication apparatus, a shot image obtained by imaging an object;
displaying, by the image communication apparatus, at least the shot image;
generating, by the image communication apparatus, a captured image by capturing an image displayed on the display unit;
encoding, by the image communication apparatus, an image;
decoding, by the image communication apparatus, an encoded image;
controlling, by the image communication apparatus, write of the encoded shot image in a memory and readout of a recorded image stored in the memory;
obtaining, by the image communication apparatus, information indicating whether another apparatus requires OSD (On Screen Display) information;
accepting, by the image communication apparatus, instruction for playback of the recorded image stored in the memory; and transmitting, by the image communication apparatus, the recorded image to the other apparatus through a network; and switching transmission modes of the recorded image based on the information obtained, wherein the transmission modes comprise a first mode of transmitting the recorded image on which a plurality of processes of the decoding, the display, the capturing, and the encoding are performed, and a second mode of transmitting the recorded image on which processes that at least one process is excluded from the plurality of processes are performed, and wherein, in a case where the recorded image is transmitted by the first mode, remote control from the other apparatus is enabled, and in another case where the recorded image is transmitted by the second mode, the remote control from the other apparatus is disabled.

17. A non-transitory computer readable medium storing a computer-executable program for causing a computer to perform a control method, the method comprising:

outputting, by an image communication apparatus, a shot image obtained by imaging an object;

displaying, by the image communication apparatus, at least the shot image;

generating, by the image communication apparatus, a captured image by capturing an image displayed on the display unit;

encoding, by the image communication apparatus, an image;

decoding, by the image communication apparatus, an encoded image;

controlling, by the image communication apparatus, write of the encoded shot image in a memory and readout of a recorded image stored in the memory;

obtaining, by the image communication apparatus, information indicating whether another apparatus requires OSD (On Screen Display) information;

accepting, by the image communication apparatus, instruction for playback of the recorded image stored in the memory; and transmitting, by the image communication apparatus, the recorded image to the other apparatus through a network; and switching transmission modes of the recorded image based on the information obtained, wherein the transmission modes comprise a first mode of transmitting the recorded image on which a plurality of processes of the decoding, the display, the capturing, and the encoding are performed, and a second mode of transmitting the recorded image on which processes that at least one process is excluded from the plurality of processes are performed, and wherein, in a case where the recorded image is transmitted by the first mode, remote control from the other apparatus is enabled, and in another case where the recorded image is transmitted by the second mode, the remote control from the other apparatus is disabled.

* * * * *